United States Patent Office 3,273,358
Patented Sept. 20, 1966

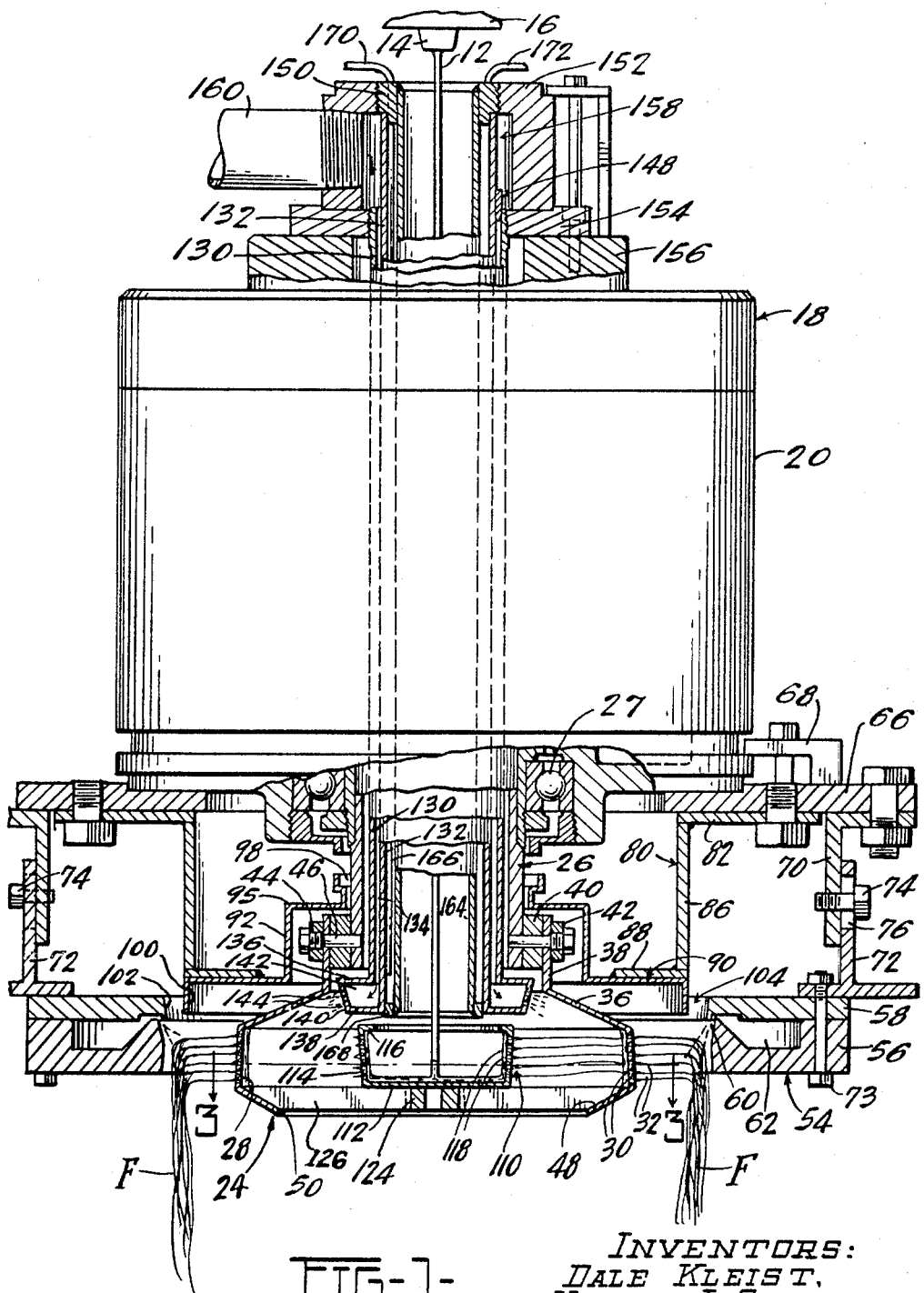

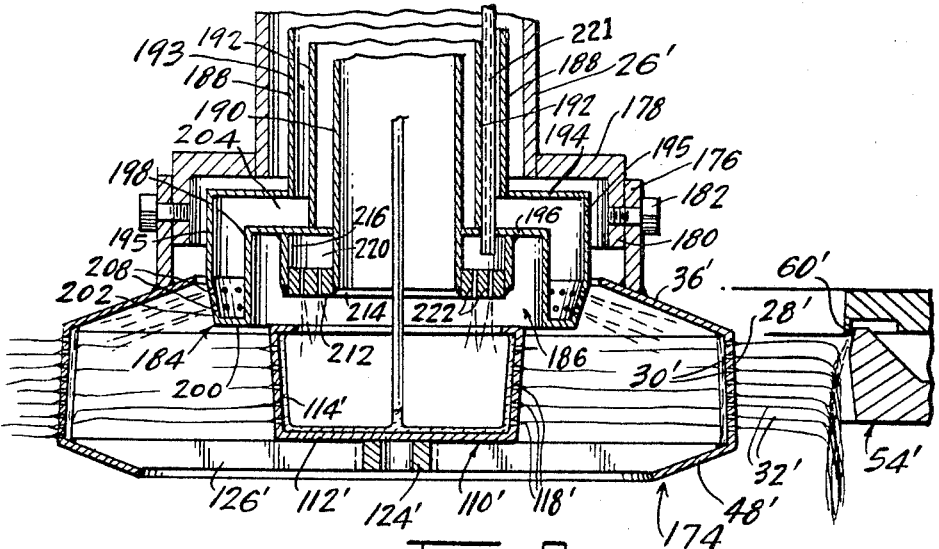
FIG-2-
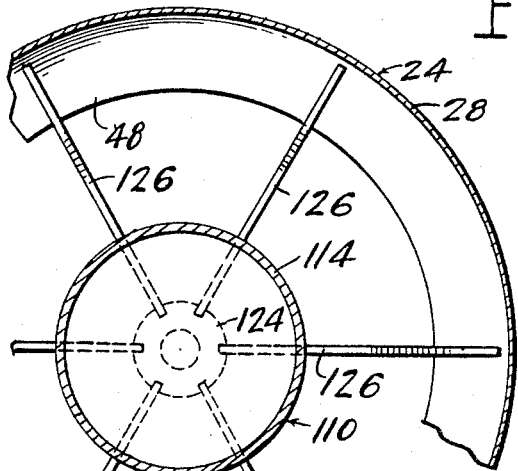
FIG-3-
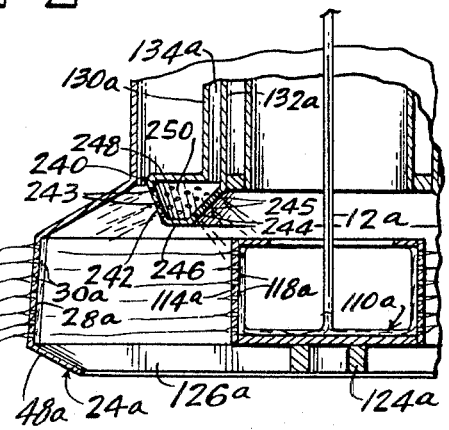
FIG-5-
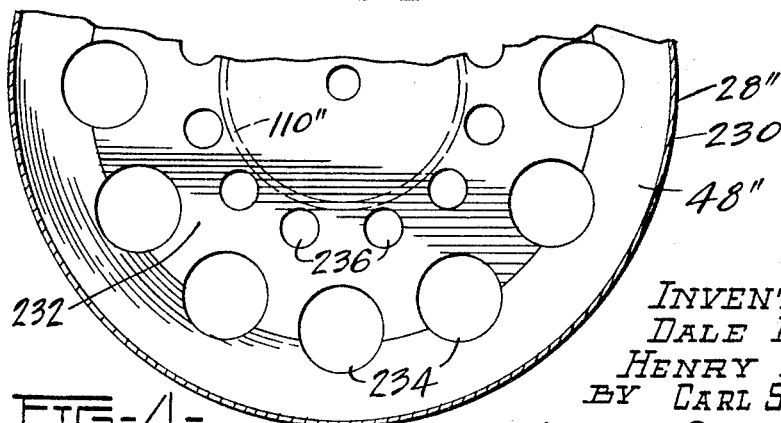
FIG-4-
INVENTORS:
DALE KLEIST,
HENRY J. SNOW,
BY CARL S. BUCHANAN
ATTYS.

3,273,358
METHOD OF AND APPARATUS FOR
FORMING FIBERS
Dale Kleist, Sur Lausanne, Switzerland, and Henry J.
Snow and Carl S. Buchanan, Newark, Ohio, assignors
to Owens-Corning Fiberglas Corporation, Toledo, Ohio,
a corporation of Delaware
Continuation of application Ser. No. 738,692, May 29,
1958. This application June 2, 1961, Ser. No. 114,376
9 Claims. (Cl. 65—6)

This is a continuation of Serial No. 738,692, filed May 29, 1958, now abandoned.

This invention relates to a method of and apparatus for forming fibers or filaments from heat-softenable mineral materials and more especially to a method and apparatus wherein heat-softened mineral material such as glass is subjected to centrifugal forces to form the material into discrete linear bodies and attenuating the bodies to fine fibers by engaging the bodies with a high energy, high velocity, gaseous blast, preferably of a temperature below the attenuating temperature of the material.

Apparatus has been used for forming heat-softened mineral materials to fibers embodying a hollow rotor having a perforated wall wherein heat-softened material is extruded through the perforations or openings by centrifugal forces and the extruded material engaged by a high velocity gaseous blast.

Difficulties have been encountered in endeavoring to maintain the centrifuged bodies of material in a proper viscous condition to foster or facilitate efficient attenuation of the bodies of the material to fibers. The rotor or spinner is rotated at a comparatively high speed in order to develop centrifugal forces effective to deliver the material outwardly of the rotor and into the attenuating blast, and such rotation accelerates heat loss and cooling of the rotor and the glass or other fiber-forming material contained therein. Cooling or reduction in temperature raises the viscosity of the glass and often effects solidification or "freezing" of the glass in the rotor or spinner preventing further operation of the process.

The present invention embraces a method of forming fibers from heat-softenable mineral materials, such as glass, involving the steps of delivering the heat-softened material outwardly from an axis by centrifugal forces from a rotating surface and establishing a heated region or regions adjacent the rotating surface to retard heat loss and maintain the material in a mobile viscous condition for delivery of the material into a gaseous blast for attenuation to fibers.

An object of the invention is the provision of a method for establishing a heated zone or region adjacent a rotor adapted to extrude heat-softenable material by centrifugal forces wherein the heat is derived from the combustion or burning of a combustible mixture in the zones of the rotor and material for maintaining optimum temperatures, facilitating efficient attenuation of the extruded material to fibers.

Another object of the invention is the provision of an apparatus for forming fibers from heat-softenable material wherein discrete bodies of the material are projected outwardly through openings in a rotor under the influence of centrifugal forces into an attenuating blast, the apparatus embodying means for directing heat into the rotor for retarding heat loss and maintaining the temperatures within and adjacent the rotor at optimum conditions for proper delivery of the material at an atenuating temperature into an attenuating blast.

Another object of the invention is the provision of an apparatus for forming fibers from heat-softenable material wherein bodies of the material are projected from a material distributing means disposed within a rotor wherein the material from the distributor is moved by centrifugal forces to a perforated region of the rotor and thence through the perforations as discrete linear bodies delivered into an attenuating blast, the apparatus including means for establishing a continuous heated zone adjacent the distributing means and interiorly of the rotor for retarding heat loss and maintaining the heat-softenable material at a proper viscosity for mobile distribution of the material by centrifugal forces.

Another object of the invention is the provision of an apparatus for forming fibers from heat-softenable material wherein the material is projected from a material distributing means disposed within a rotor wherein the material from the distributor is moved by centrifugal forces to a perforated region of the rotor, the apparatus including means adjacent the distributing means and adjacent the rotor for burning combustible mixture in the region of the distributor and the interior region of the rotor to retard heat loss and maintain the material at the distributor and the material in the rotor at proper viscosity facilitating delivery of the material to an attenuating medium for formation of the material into fibers.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a fiber-forming apparatus embodying a form of heat establishing means of the invention, certain parts being shown in section;

FIGURE 2 is a sectional view illustrating a modified form of the invention;

FIGURE 3 is a sectional view taken substantially on the line 3—3 of FIGURE 1;

FIGURE 4 is a fragmentary sectional view showing a modified form of rotor structure; and FIGURE 5 is a fragmentary sectional view illustrating another form of heat establishing means of the invention.

The method and apparatus of the invention are particularly adaptable for use in processing heat-softenable mineral material such as glass into fine fibers, but it is to be understood that the method and apparatus may be utilized in the formation of fibers or filaments from other heat-softenable mineral materials, such as slag, fusible rock or wherever the invention may be found to have utility.

The fiber-forming apparatus for carrying out the method of the invention is preferably constructed in the form of a unit which may be utilized by itself or in multiple with other units of the same character where it is desired to obtain high fiber production, particularly, for forming a fibrous pack or mat of substantial width and thickness.

The fiber-forming apparatus illustrated in FIGURE 1 is adapted to receive a stream 12 of heat-softened glass or other heat-softened material flowing from an orifice in a feeder 14 disposed beneath a forehearth 16 which receives glass or other heat-softened material in a flowable state from a suitable melting furnace or tank (not shown) in which glass batch or other mineral material is reduced to a molten condition by the application of heat in a conventional manner. While FIGURE 1 illustrates a single stream 12 of glass delivered into the fiber-forming unit, it is to be understood that several streams may be delivered into the unit dependent upon the rate of processing of the glass to fibers.

The fiber-forming unit 18 is adapted to process the glass of the stream into discrete bodies which are projected into an attenuating medium, such as a gaseous blast, the gases of which move in directions generally normal to the paths of traverse of the glass into the blast. The fiber-forming apparatus illustrated in FIGURE 1 includes a generally cylindrical casing or housing 20 which may be supported by suitable frame structure (not shown). The fiber-forming apparatus includes a hollow rotor or spinner 24 supported upon the lower end of a hollow shaft 26 which is journalled for rotation in suitable bearings, one of which is shown at 27. The shaft and rotor are adapted to be driven or rotated by an electrically energizable motor (not shown) which may be disposed within the housing 20 or otherwise operatively connected with the shaft 26. The rotor 24 is fashioned with comparatively thin wall sections in order to reduce the weight of the rotor to a minimum commensurate with the strength necessary to resist distortion or fracturing by centrifugal forces. The rotor may be fashioned of suitable metals or alloys, such as stainless steel or other metals or alloys having high strength characteristics and capable of withstanding the intense heat of the heat-softened glass or other material.

The rotor is formed with a peripheral wall or circular band 28 which may be of generally cylindrical shape or slightly tapered as shown in FIGURES 1 and 2. The circular wall 28 is provided with several rows of comparatively small outlets or orifices 30 through which the heat-softened glass is projected or extended under the influence of centrifugal forces of rotation of the rotor in the form of discrete linear bodies or primary filaments 32 which move outwardly from the rotor in planes normal to the axis of rotation.

The upper region of the wall 28 is joined with a frusto-conically shaped wall 36 which is welded or otherwise secured to an upwardly extending sleeve portion or hollow hub 38. Disposed between the exterior surface of the lower end of shaft 26 and the sleeve 38 is a spacer or annular member 40 preferably welded to the shaft 26. Surrounding the sleeve or hub 38 is a ring 42 having a plurality of circumferentially spaced threaded openings to receive the threaded portions 44 of supporting members 46. The cylindrical portions of members 46 extend into registering openings formed in the shaft 26 and the ring 40 and serve to secure the rotor to the shaft.

A frusto-conically shaped wall 48 is secured to the lower region of the circular wall 30 and terminates in an edge 50, shown in FIGURE 1, defining a circular opening through which gases may escape from the interior of the rotor 24. Surrounding the rotor 24 is a blower construction 54 formed with a housing or body and cover components 56 and 58, the construction being provided with an annular orifice 60. The housing member 56 of the blower is formed with a manifold or chamber 62 which receives steam under pressure or compressed air from a supply (not shown).

The steam or compressed air is discharged through the annular orifice 60 as a high velocity gaseous blast of generally cylindrical configuration. The gases of the blast engage the discrete bodies 32 of glass projected into the blast by centrifugal forces, the blast attenuating the bodies to fibers F which move away from the fiber-forming apparatus in the form of a hollow beam, tube or veil configuration. The fibers may be collected upon a movable conveyor (not shown) to form a fibrous pack or mat in a conventional manner.

The annularly-shaped blower construction 54 is suspended from a plate 66 secured to the housing 20 by circumferentially spaced lugs or brackets 68, one of which is shown in FIGURE 1. Secured to the plate 66 is a plurality of brackets 70, the brackets 70 supporting members 72 which are secured to the blower housing by means of bolts 73. Each of the brackets 70 is formed with a threaded opening to receive a securing bolt 74 which extends through a vertically elongated slot 76 in the bracket 72 to facilitate vertical adjustment of the blower housing 54 to properly position the orifice 60 with respect to the centrifuged bodies 32 to facilitate efficient attenuation.

Disposed beneath the plate 66 is a member 80 formed with an annular ledge or flange 82 secured to the plate 66. The member 80 is formed with a downwardly extending circular wall 86, to the lower end of which is secured an inwardly extending annular flange 88. Secured to the inwardly extending flange 88 is a member 90 formed with a circular wall 92 and an annular flange 95 which surround the region of attachment of the rotor to the shaft 26. The flange 95 is shaped to define a space 98 adjacent the shaft 26 for limiting the amount of air flow along the shaft 26 and exterior wall 36 of the rotor.

The member 90 is formed with a depending circular skirt 100 which with an interior surface of the blower cap 58 defines an annular throat or passage 104 through which blast-induced air flows from a region above the blower into contact with the gases of the blast. The annular passage 104 is concentric with the annular orifice 60.

Means is provided disposed interiorly of the rotor or spinner 24 adapted to receive the stream or body 12 of glass and distribute the material into contact with the interior surface of the rotor wall 28 providing a quantity of glass at the wall 28 from which the bodies 32 are extruded.

In the embodiment illustrated in FIGURE 1, the material distributing means within the rotor is in the form of a cup-like member 110 arranged to rotate with the rotor and having an imperforate bottom wall 112, a circular side wall 114 and a reinforcing annular flange 116 secured to the upper edge region of the circular wall 114.

The circular wall 114 may be canted slightly upwardly and outwardly as shown to assist in more uniform vertical distribution of the glass along the circular wall and is formed with a substantial number of orifices or outlets 118 through which the heat-softened glass is projected or delivered by centrifugal forces of rotation of the cup 110 into contact with the interior surface of the rotor wall 28.

As shown in FIGURES 1 and 3, there is disposed at the central region of the rotor and beneath the cup 110 an annular ring or member 124 which is connected with the frusto-conically shaped wall 48 of the rotor by a plurality of radially arranged spokes or struts 126 which may be welded at their inner ends to the ring 124 and at their outer ends to the rotor wall 48. The ring 124 and the spokes or radial members 126 provide a supporting means upon which the cup 110 is mounted.

The bottom wall 112 of the cup is welded or otherwise secured to the radially disposed members 126 whereby the distributing means or cup 110 rotates with the rotor. Due to the distance traversed by glass stream 12 from the feeder 14 into the distributor 110 and the high speed rotation of the rotor, heat loss ensues which increases the viscosity of the glass and hence impairs its mobility.

The arrangement illustrated in FIGURE 1 embraces a method and means for establishing a heated zone within the rotor and continuously delivering heat into the rotor directed toward the peripheral wall 28 and the glass adjacent the wall to retard the heat loss within the rotor and to maintain the heat-softened glass in a condition of mobility to facilitate the centrifugal extrusion of the glass through the outlets 30 in the rotor wall 28.

Disposed within the hollow shaft 26 and concentric with but spaced therefrom is an outer sleeve or wall 130 and an inner wall 132 spaced to provide an annular passage or chamber 134 which is adapted to contain a combustible mixture such as fuel gas and air. The lower end of the outer sleeve 130 is formed with an outwardly extending annular flange 136 and the inner sleeve is provided at its lower end with an outwardly extending flange 138 which are joined by a frusto-conically shaped wall or surface 140, the annular flanges 136, 138, the wall 140 and the lower wall region of the sleeve 132 forming an annular manifold burner chamber 142.

As shown in FIGURE 1, the annular burner chamber is disposed above the peripheral region or wall 114 of the cup-like distributor 110. The angularly arranged wall 140 is formed with rows of orifices 144 through which combustible mixture in the burner manifold 142 is delivered under comparatively low pressure and is ignited and burns exteriorly of the wall 140 and interiorly of the rotor. The passages or orifices 144 project the combustible gases in generally radial paths along the rotor wall 36 so that a heated region is established by the burning gases to heat the rotor and the glass disposed adjacent the wall 28.

The upper end regions of the sleeve or walls 130 and 132 are held in spaced relation by means of peripherally spaced members or spacers 148, one of which is shown in FIGURE 1, the inner sleeve 132 projecting into engagement with a fitting 150 extending into a threaded bore in a stationary cap member 152 supported by an annular member 154. The member 154 is mounted upon an annular member 156 carried by the housing 20. The cap member 152 is recessed to form an annular passage or manifold 158 which is connected by means of a pipe 160 with a supply of combustible mixture, such as fuel gas and air.

During operation of the apparatus, fuel and air mixture under comparatively low pressure flows from a supply through the pipe 160, manifold 158, downwardly through the annular passage 134 into the supplemental or burner manifold 142, thence through the orifices or passages 144, and is burned within the rotor. The passages or orifices 144 are of small size to prevent preignition of the mixture in the supplementary or burner manifold 142.

Means is provided to maintain the sleeves 130 and 132 at safe operating temperatures to prevent overheating of the mixture delivered through the annular passage 134. Disposed within the sleeve 132 and spaced therefrom is a cylindrical sleeve 164 which with sleeve 132 forms an annular cooling jacket or chamber 166, the lower end of the chamber 166 being closed by an annulus 168 welded to the lower ends of sleeves 132 and 164.

The chamber 166 is adapted to accommodate circulating cooling fluid, such as water, which is conveyed into the chamber through an inlet pipe 170 and conveyed therefrom by an outlet pipe 172. The products of combustion from the burning of combustible gases within the rotor 24 are discharged through the opening defined by the circular edge 50 of the rotor wall 48.

FIGURE 2 illustrates a modified form of burner construction adapted to establish a heated zone within and adjacent the peripheral wall of the rotor and within the glass distributing means disposed within the rotor. In the arrangement shown in FIGURE 2, the circular wall 28' and the frusto-conically shaped walls 36' and 48' of the rotor 174 are substantially the same as the corresponding components of the rotor construction 24 shown in FIGURE 1. The rotor is carried upon the lower end of the hollow shaft 26' by a means modified from that shown in FIGURE 1.

Welded to and extending upwardly from the rotor wall 36' is an annular sleeve-like portion 176. Secured to the lower end of the hollow shaft 26' is an outwardly extending annular ledge or flange 178 from which depends a circular sleeve 180 which snugly fits within the ring-shaped member 176.

Circumferentially spaced bolts 182 extend through openings in the member 176 and into threaded openings in the depending circular wall 180 to secure the rotor to the shaft 26' for rotation thereof. The shaft 26' is rotated by an electrically energizable motor (not shown).

The glass distributing means 110' is of the same construction as the distributor 110 shown in FIGURE 1 and previously described herein. The bottom wall 112' of the distributor is supported upon a centrally disposed ring 124' and radially arranged spokes 126' in the same manner as herein described in connection with FIGURE 1. A blower construction 54' provides a gaseous blast preferably steam or compressed air delivered through an annular orifice 60' for attenuating centrifuged glass bodies 32' to fibers.

The heat producing means illustrated in FIGURE 2 provides a burner 184 adapted to establish a heated region adjacent the interior peripheral zone of the rotor 174 and a second or supplemental burner 186 adapted to deliver heat into or establish a heating zone adjacent and within the glass distributing means or cup 110'. Disposed within the hollow shaft 26' is an outer sleeve 188, an inner sleeve 190 and an intermediate sleeve 192 arranged in spaced concentric relation. Secured to the end of the outer sleeve 188 is a radially extending flange or wall 194 which joins a depending circular wall 195.

A radially extending flange or wall 196 is welded to the inner wall 190 and to the lower edge of the intermediate sleeve 192. A circular wall 198 depends from the flange 196 and the lower edge of the wall 198 is joined with a radially extending wall 200, a frusto-conically shaped wall or orifice plate 202 joining the flange 200 and outer circular wall 195. The flanges 194, 196, 200, the circular walls 195, 198 and the orifice plate 202, form or define an annularly shaped burned manifold chamber 204 adapted to contain a combustible mixture such as fuel gas and air.

The outer sleeve 188 and the intermediate sleeve 192 define an annular space, chamber or passage 193 which conveys combustible mixture from a supply into the burner manifold or chamber 204. The mixture is delivered into the annular space 193 by an arrangement of the character illustrated in FIGURE 1 and hereinbefore described.

The frusto-conically shaped orifice plate 202 is formed with a plurality of passages or orifice 208 through which the mixture is delivered from the annular manifold 204 and is ignited and burns in the interior region of the rotor 174 adjacent the rotor walls 28' and 36'.

The heat of the burning gases retards heat losses and maintains the temperature of the rotor walls and the fiber-forming material being delivered from the distributor 110' into contact with the perforated rotor walls 28' so that the fiber-forming material is of a proper viscosity and mobility to facilitate extrusion of the glass or other material through the rotor orifices 30' to form the discrete linear bodies 32'.

As particularly shown in FIGURE 2, the angularity of the orifice plate 202 and the passages 208 therein are such as to direct the mixture along the wall 36', the mixture being burned during its traverse along the wall 36'.

The supplemental or secondary burner 186 shown in FIGURE 2 comprises an orifice plate 212 of annular shape having its inner surface welded to the lower edge of the sleeve 190 and its outer surface welded or secured to a depending circular wall 216, the upper edge of which is welded or otherwise secured to the radially extending flange 196. The adjacent wall region of the sleeve 190, the region of the flange 196 between the sleeve 190 and the circular wall 216, and the orifice plate 212 define a supplemental burner manifold chamber 220.

The mixture is preferably supplied to the supplemental burner 186 through a mixture conveying tube 221 extending downwardly through the space defined by the outer wall 188 and the intermediate wall 192 as illustrated in FIGURE 2. Valve means (not shown) may be provided for the mixture supplied to the manifold 204 and the mixture supplied to the supplemental burner manifold 220 so as to regulate or control the mixture delivered to each burner independently of the other.

The annularly-shaped orifice plate 212 of the secondary or supplemental burner 186 is provided with a plurality of small passages 222, through which mixture from the chamber 220 is delivered under comparatively low pressure into the interior peripheral region of the cup-like distributor 110', the mixture being burned below the orifice plate 212 and in the peripheral region of the distributor.

Through this arrangement, the substantially circular wall 114' of the distributor 110' is subjected to the heat of the burning gases from the burner 186 to maintain the wall 114' and the glass adjacent the wall at a proper temperature to facilitate extrusion of the glass or material in the distributor cup 110' through the orifices 118' for traverse into contact with the inner surface of the rotor wall 28'.

Thus, by establishing heated zones adjacent the interior peripheral regions of the distributor cup 110' and the rotor 174', maintenance of the proper temperatures in these regions may be attained so that the linear bodies 32' of glass extruded from the orifices in the wall 28' will be in a most favorable attenuable condition as they are delivered into the attenuating blast from the annular orifice 60'.

FIGURE 4 is illustrative of a modified form of the bottom wall of a rotor construction 230. In this form, the peripheral wall 28'' is provided with a lower frusto-conically shaped wall 48'' of the same configuration as shown in FIGURES 1 and 2. In the form shown in FIGURE 4, the rotor is provided with a bottom wall 232 which is joined to the frusto-conically shaped wall 48''. The distributor cup 110'' is supported directly upon the bottom wall 232 of the rotor. In order to facilitate the escape of gases from the interior of the rotor, the bottom wall 232 is provided with circular rows of openings 234 and 236, the openings of the outer row being preferably of larger dimension than those of the inner row to minimize centrifugal stresses. The arrangement shown in FIGURE 4 may be utilized with any of the heat establishing means disclosed herein.

FIGURE 5 is illustrative of a modified form of burner of the invention. In this form, the rotor 24a is of substantially the same configuration as the rotor illustrated in FIGURE 1. The cup shaped distributor 110a is supported by a centrally disposed ring 124a, the ring being joined to the rotor wall 48a by radially disposed spokes 126a. The circular wall 114a of the distributor is formed with orifices or outlets 118a through which glass from the stream 12a is extruded into contact with the inner surface of the wall 28a and the material extruded through the orifices 30a to form discrete linear bodies.

The burner 240 is equipped or fashioned with two orifice plates 242 and 244 which are joined by a lower wall 246. The orifice plate 242 is joined by an annularly shaped wall 248 with an outer sleeve 130a, and the orifice plate 244 joined with an inner sleeve 132a, the components defining an annularly shaped burner manifold 250. The orifice plate 242 and the mixture delivering passages 243 therein are arranged to direct the mixture toward the peripheral wall 28a of the rotor and the mixture burned during its traverse toward the rotor wall to establish a heated zone of the character described in connection with the burner shown in FIGURE 1.

The orifice plate 244 and the passages 345 therein are arranged to direct combustible mixture toward the exterior surface of the circular wall 114a of the distributor cup 110a in order to maintain the wall 114a of the cup and the adjacent region at a proper temperature to facilitate the extrusion or delivery of material within the cup through the orifices 118a.

Combustible mixture, such as fuel gas and air, is delivered into the burner manifold 250 through the annular space 134a provided between the sleeves 130a and 132a by means of an arrangement of the character illustrated in FIGURE 1.

Thus, in the form of heat applying means described herein, heated regions are established at critical zones to retard heat loss and maintain the glass or other fiber-forming material at a temperature and viscosity to perpetuate and facilitate its mobility from the period of its delivery in softened condition into the distributor to its eventual region of entry into the attenuating blast.

It is apparent that, within the scope of the invention, modifications and different arrangements may be made other than is herein disclosed, and the present disclosure is illustrative merely, the invention comprehending all variations thereof.

We claim:

1. In the process of producing glass fibers by centrifugal force cooperating with a gaseous attenuating blast, the improvement which comprises flowing molten glass into a first rotating receptacle having openings to project the glass as streams onto the inner surface of a second rotating receptacle spaced from the first receptacle, projecting the glass on the inner surface of the second receptacle through openings therein in the form of molten glass streams, engaging the molten glass streams outside of the second receptacle with a gaseous blast moving transversely to the direction of movement of the streams from the second receptacle at such velocity as to draw out the molten glass into fibers and at a temperature below the temperature at which the molten glass is drawn out into fibers, applying to the molten glass by burning a gaseous medium within the second receptacle all of the heat needed to maintain the glass in the condition in which it is adapted to be drawn out into fibers until it is engaged by the attenuating blast.

2. In the process of producing glass fibers by centrifugal force cooperating with a gaseous attenuating blast, the improvement which comprises flowing molten glass into a first rotating receptacle having openings to project the glass as streams onto the inner surface of a second rotating receptacle spaced from the first receptacle, projecting the glass on the inner surface of the second receptacle through openings therein in the form of molten glass streams, engaging the molten glass streams outside of the second receptacle with a blast of steam moving transversely to the direction of movment of the streams from the second receptacle at such velocity as to draw out the molten glass into fibers and at a temperature below the temperature at which the molten glass is drawn out into fibers, applying to the molten glass by burning a gaseous medium within the second receptacle all of the heat needed to maintain the glass in the condition in which is is adapted to be drawn out into fibers until it is engaged by the steam blast.

3. In the process of producing glass fibers by centrifugal force cooperating with a gaseous attenuating blast, the improvement which comprises flowing molten glass into a first rotating receptacle having openings to project the glass as streams onto the inner surface of a second rotating receptacle spaced from the first receptacle, projecting the glass on the inner surface of the second receptacle through openings therein in the form of molten glass streams, engaging the molten glass streams outside of the second receptacle with a gaseous blast moving transversely to the direction of movement of the streams from the second receptacle at such velocity as to draw out the molten glass into fibers and at a temperature below the temperature at which the molten glass is drawn out into fibers, and burning a gaseous medium in the region between the receptacles to supply to the molten glass all of the heat needed to maintain the glass in the condition in which it is adapted to be drawn out into fibers until it is engaged by the attenuating blast.

4. In the process of producing glass fibers by centrifugal force cooperating with a gaseous attenuating blast, the improvement which comprises flowing molten glass into a first rotating receptacle having openings to project the glass as streams onto the inner surface of a second rotating receptacle spaced from the first receptacle, projecting the glass on the inner surface of the second receptacle through openings therein in the form of molten glass streams, engaging the molten glass streams outside of the second receptacle with a blast of steam moving transversely to the direction of movement of the streams from the second receptacle at such velocity as to draw out the molten glass into fibers, and burning a gaseous medium in the region between the first receptacle and the second receptacle to supply to the molten glass all of the heat needed to maintain the glass in the condition in which it is adapted to be drawn out into fibers until it is engaged by the attenuating blast.

5. Apparatus for forming fibers from heat-softenable mineral material including, in combination, a support, a hollow shaft journaled on the support, a hollow rotor carried by the shaft and having a peripheral wall formed with a plurality of orifices, an annularly shaped manifold surrounding the rotor and spaced therefrom and adapted to contain steam under pressure, said manifold having an annular orifice through which steam in the manifold is discharged as a generally cylindrical high velocity blast, a material distributing cup in said rotor adapted to be rotated with the rotor, means for feeding heat-softened material from a supply into the distributing cup, means for rotating the hollow shaft, rotor and distributing cup whereby the material is projected by centrifugal forces from the distributing cup to the peripheral wall and through the orifices, annularly shaped burner means within the rotor adapted to receive combustible mixture from a supply, said burner means having concentric circular wall regions, each circular wall being formed with a group of circumferentially spaced passages wherein the passages of one group are arranged to direct combustible mixture toward the distributing cup and the passages of the other group arranged to direct combustible mixture toward the interior region of the peripheral wall of the rotor whereby the mixture is burned adjacent the distributing cup and adjacent the peripheral wall for applying heat to the distributing cup, the rotor wall and the mineral material.

6. Apparatus for forming fibers from heat-softenable mineral material including, in combination, a support, a hollow shaft journaled on the support, a hollow rotor carried by the shaft and having a peripheral wall formed with a plurality of orifices, means surrounding the rotor and spaced therefrom for establishing a generally cylindrical high velocity gaseous blast, a cup-shaped material distributing means having a perforated peripheral wall disposed in said rotor adapted to be rotated with the rotor, means for feeding heat-softened material from a supply to the distributing means, means for rotating the shaft, rotor and distributing means whereby the material is projected by centrifugal forces from the distributing means to the peripheral wall and through the orifices into the gaseous blast for attenuation thereby to fibers, an enlarged annularly shaped burner means disposed within the rotor adapted to receive combustible mixture from a supply, said burner means being provided with circumferentially spaced concentric walls each formed with a group of passages arranged to deliver combustible mixture in a region interiorly of the distributing means and toward the interior region of the peripheral wall of the rotor whereby the mixture is burned in said regions for controlling the condition of mobility of the mineral material.

7. Apparatus for processing heat-softenable mineral material including, in combination, a support, a hollow shaft journaled on the support, a hollow rotor carried by the shaft and having a peripheral wall formed with a plurality of orifices, a manifold surrounding the rotor and spaced therefrom and adapted to contain steam under pressure, said manifold being formed with an annularly shaped orifice through which steam is distributed as a generally cylindrical high velocity blast of a temperature below the attenuating temperature of the material, a material distributing cup in said rotor adapted to be rotated with the rotor, means for feeding heat-softened material from a supply to the distributing cup, means for rotating the shaft, rotor and distributing cup whereby the material is projected by centrifugal forces from the distributing cup to the peripheral wall and through the orifices into the blast for attenuation thereby to fibers, burner means adapted to receive combustible mixture from a supply, one of said burner means being provided with a wall having circumferentially spaced passages arranged to deliver combustible mixture in a region interiorly of the distributing cup, another of said burner means provided with a wall having circumferentially spaced passages arranged to deliver combustible mixture in a annular region between the distributing cup and the peripheral wall of the rotor whereby the mixtures are burned in said regions.

8. Apparatus for forming fibers of heat-softenable mineral material including, in combination, a support, a hollow shaft journaled on the support, a hollow rotor carried by the shaft and having a peripheral wall formed with a plurality of orifices, a manifold surrounding the rotor and spaced therefrom and adapted to contain steam under pressure, said manifold being formed with an annularly shaped orifice through which the steam is discharged in a generally cylindrical high velocity blast, a cup-shaped material distributing means in said rotor having a perforated peripheral wall adapted to be rotated with the rotor, means for feeding heat-softened material from a supply to the distributing means, means for rotating the shaft, rotor and distributing means whereby the material is projected by centrifugal forces from the distributing means to the peripheral wall and through the orifices into the blast for attenuation thereby to fibers, burner means including two independent concentrically arranged walled manifold chambers disposed within the rotor adapted to receive combustible mixture from supply means, a wall of one chamber having passage means for directing combustible mixture interiorly of the distributing means, a wall of the other chamber having passage means for directing combustible mixture exteriorly of the cup-shaped distributing means and interiorly of the rotor whereby the mixtures are burned in said distributing means and said rotor establishing heat for controlling the mobility of the mineral material.

9. Apparatus for forming heat-softenable mineral material into fibers including, in combination, a support, a hollow rotor having a peripheral wall provided with a plurality of small orifices, a hollow shaft journaled on the support and carrying the rotor, a manifold surrounding the rotor adapted to contain steam under pressure, said manifold being formed with an annular orifice adapted to deliver steam from the manifold as a generally cylindrical blast of a temperature below the attenuating temperature of the fiber-forming material, a cup-like member supported within the rotor having a wall provided with openings, means for feeding heat-softened mineral material from a supply into the cup-like member, means for rotating the rotor and cup-like member whereby the mineral material is projected by centrifugal forces through the openings in the member to the rotor wall and through the orifices into the gaseous blast and attenuated by the blast to fibers, burner means for establishing heat in the region of the member and rotor including a pair of manifold chambers adapted to contain combustible mixture, a wall of one of the chambers being formed with circumferentially spaced passages arranged to direct combustible mixture toward the peripheral wall region of the rotor, a wall of the other chamber being formed with circumferentially spaced passages arranged to direct combustible mixture into the region defined by the cup-like member whereby the mixtures are burned in said regions to control the condition of mobility of the material.

References Cited by the Examiner
UNITED STATES PATENTS

| | | |
|---|---|---|
| 2,192,944 | 3/1940 | Thomas. |
| 2,328,714 | 9/1943 | Drill et al. |
| 2,431,205 | 11/1947 | Slayter. |
| 2,497,369 | 2/1950 | Peyches. |
| 2,603,833 | 7/1952 | Stalego et al. |
| 2,609,566 | 9/1952 | Slayter et al. |
| 2,624,912 | 1/1953 | Heymes et al. |
| 2,980,954 | 4/1961 | Levecque et al. _____ 65—15 |
| 3,017,663 | 1/1962 | Levecque et al. _____ 65—14 |
| 3,044,110 | 7/1962 | Hess _____ 65—14 |
| 3,048,886 | 8/1962 | Firnhaber et al. _____ 65—14 |
| 3,058,322 | 10/1962 | Eravd _____ 65—14 |

FOREIGN PATENTS

| | | |
|---|---|---|
| 1,124,487 | 10/1956 | France. |
| 1,127,561 | 12/1956 | France. |
| 571,807 | 2/1933 | Germany. |

DONALL H. SYLVESTER, *Primary Examiner.*

MICHAEL V. BRINDISI, *Examiner.*

L. D. RUTLEDGE, P. GOLDSTEIN, C. VANHORN, D. CRUPAIN, *Assistant Examiners.*